United States Patent [19]

Orimoto

[11] Patent Number: 5,778,205
[45] Date of Patent: Jul. 7, 1998

[54] DATA COMMUNICATION SYSTEM AND PORTABLE DATA PROCESSING TERMINAL USED THEREIN

[75] Inventor: Takashi Orimoto, Akiruno, Japan

[73] Assignee: Casio Computer Co., Ltd., Tokyo, Japan

[21] Appl. No.: 639,282

[22] Filed: Apr. 25, 1996

[30] Foreign Application Priority Data

Apr. 26, 1995 [JP] Japan ................................ 7-102247

[51] Int. Cl.⁶ .................................................. H01J 13/00
[52] U.S. Cl. ...................... 395/309; 395/828; 395/834; 395/831; 395/882; 395/883; 395/884; 395/892; 395/282; 395/281
[58] Field of Search ........................ 395/282, 283, 395/309, 250, 200.07, 200.1, 200.12, 200.14, 200.2, 292, 856, 859, 863, 527, 500, 828, 831, 834, 882, 883, 884, 892, 893, 832

[56] References Cited

U.S. PATENT DOCUMENTS

| | | | |
|---|---|---|---|
| 5,269,005 | 12/1993 | Heil et al. | 395/821 |
| 5,371,873 | 12/1994 | Niwa | 711/1 |
| 5,421,018 | 5/1995 | Hiyama | 395/800 |
| 5,454,080 | 9/1995 | Fasig et al. | 395/283 |
| 5,526,493 | 6/1996 | Shu | 395/281 |
| 5,566,226 | 10/1996 | Mizoguchi et al. | 379/58 |
| 5,598,537 | 1/1997 | Swanstrom et al. | 395/281 |
| 5,598,539 | 1/1997 | Gephardt et al. | 395/283 |
| 5,611,055 | 3/1997 | Krishan et al. | 395/281 |

*Primary Examiner*—Ayaz R. Sheikh
*Assistant Examiner*—Raymond N. Phan
*Attorney, Agent, or Firm*—Skjerven, Morrill, MacPherson, Franklin and Friel; Alan H. MacPherson; Fabio E. Marino

[57] ABSTRACT

A data communication system comprises a portable data processing terminal, such as an electronic notebook, and an external data processing apparatus, such as a personal computer. When the electronic notebook is connected to an RS232C I/F box connected to the personal computer, an I/F switch provided in the electronic notebook is switched on to supply a connection signal to an RS232C I/F circuit in the electronic notebook. An interruption signal is supplied from the RS232C I/F circuit to a CPU of the electronic notebook so that a communication program previously stored in a ROM is activated and a communication request is sent to the personal computer. The personal computer responds to the communication request sent from the electronic notebook and returns a response signal so that a data communication process is performed.

12 Claims, 2 Drawing Sheets

DATA COMMUNICATION SYSTEM AND PORTABLE DATA PROCESSING TERMINAL USED THEREIN

BACKGROUND OF THE INVENTION

1. Field of the Invention

The present invention relates to a data communication system with a portable data processing terminal for performing data communication between the portable data processing terminal, such as an electronic notebook or the like, and an external data processing apparatus, such as a personal computer, and to the data processing terminal used therein.

2. Description of the Related Art

Hitherto, a portable data processing terminal, such as an electronic notebook, a personal digital assistance (PDA) or a mobile companion, and an external data processing apparatus, such as a personal computer, mutually communicate data by using a serial communication line, such as RS232C. A communication cable is connected between the portable data processing terminal and the personal computer, and then the portable data processing terminal is set to a communication mode. Data from the portable data processing terminal is uploaded into a memory of the personal computer or that from the personal computer is downloaded into the portable data processing terminal in accordance with communication software which is activated on the personal computer.

However, in the conventional data communication system, in which data communication is performed between the portable data processing terminal and the personal computer, the personal computer must activate the software for performing communication with the portable data processing terminal before the data communication is performed between the personal computer and the portable data processing terminal. Moreover, the portable data processing terminal is required to be set to the communication mode. Therefore, there arises a problem in that the preparation operations for the data communication are too complicated.

Moreover, the conventional data communication system encounters a problem in that if the personal computer is performing another process, the power source of the portable data processing terminal is temporarily turned off in order to prevent wasteful consumption of power supply battery. In the case, the communication mode must be again set when the personal computer is available for data communication.

That is, the conventional data communication system has a problem in that the data communication cannot be performed if a variety of artificial operations, such as the operation of setting the portable data processing terminal to the communication mode and the operation of activating the communication software of the personal computer, are not performed.

SUMMARY OF THE INVENTION

Accordingly, it is an object of the present invention to provide a data communication system enabling data communication between a portable data processing terminal and an external data processing apparatus to be performed very easily without complicated artificial operations and the portable data processing terminal therefor.

According to the present invention, there is provided a data communication system for communicating data between a portable data processing terminal and a data processing apparatus upon connection between the portable data processing terminal and the data processing apparatus, the system comprising means, provided in the portable data processing terminal, for detecting a connection between the portable data processing terminal and the data processing apparatus, means, provided in the portable data processing terminal, for outputting a communication request to the data processing apparatus when the connection is detected by the detecting means, and means, provided in the data processing apparatus, for executing data communication in response to the communication request.

According to the present invention, there is provided a portable data processing terminal comprising means for detecting connection with a connector which is connected to a data processing apparatus, means for setting a communication mode in response to a connection detection of the detecting means, means for outputting a communication request when the communication mode is set, and means for communicating data with the data processing apparatus.

According to the present invention, data communication between a portable data processing terminal and an external data processing apparatus can be performed very easily without complicated artificial operations.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of a data communication system according to the present invention will now be described with reference to the accompanying drawings.

Figure 1:
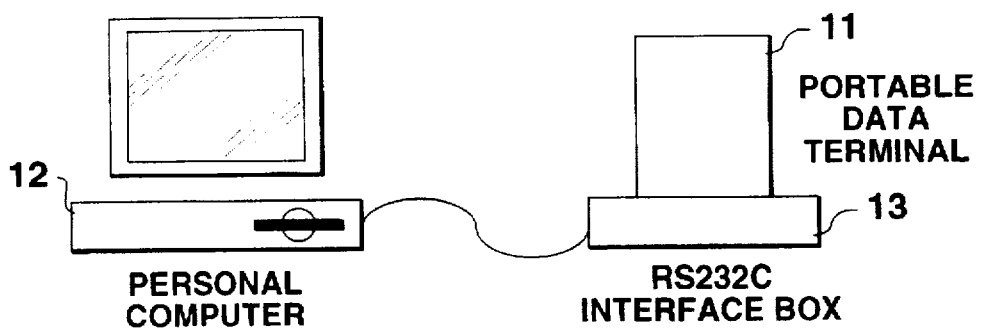
FIG. 1 is a view showing a whole data communication system including a portable data processing terminal and a personal computer according to a first embodiment of the present invention.

FIG. 1 is a diagram showing a state where a portable data processing terminal 11 and a personal computer 12 in a data communication system according to the present invention are connected to each other.

The personal computer 12 is connected to an interface (I/F) box 13 through an RS232C cable. The I/F box 13 includes a connector or socket (not shown) for receiving the portable data processing terminal 11. According to the present invention, a channel between the portable data processing terminal 11 and the personal computer 12 is connected by merely placing the portable data processing terminal 11 on the I/F box 13. The portable data processing terminal 11 may be called as an electronic notebook, a personal digital assistance (PDA) or a mobile companion.

In a portion of the portable data processing terminal 11 in which the connection with the I/F box 13 is established, there is provided an I/F switch 23 (not shown in FIG. 1 but shown in FIG. 2) which is operated when the connection with the I/F box 13 is established.

Figure 2:
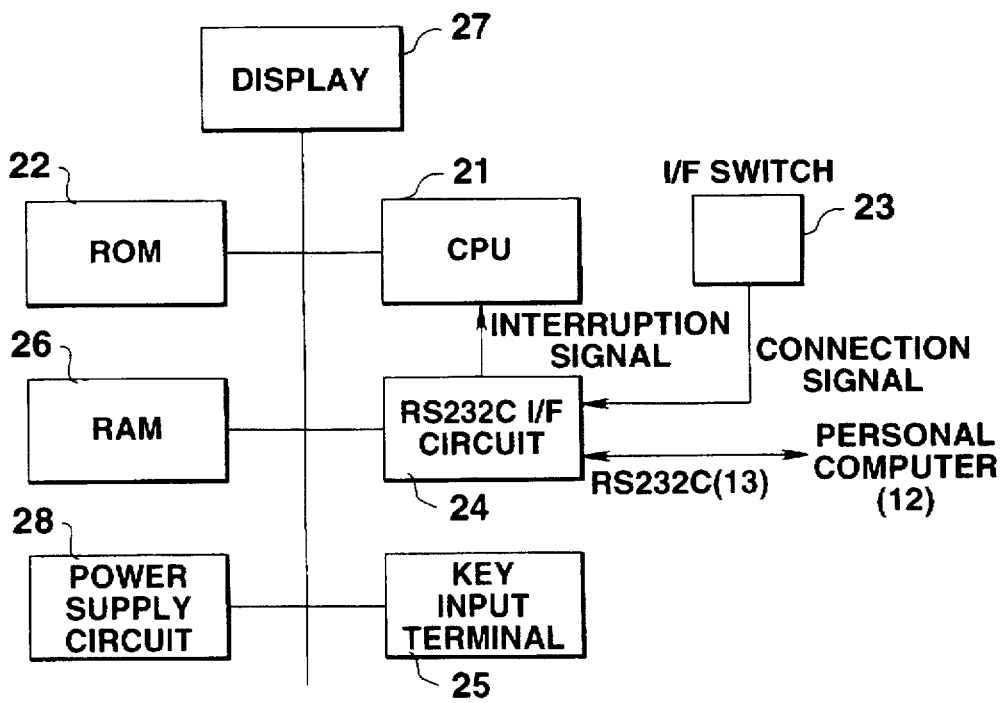
FIG. 2 is a block diagram showing the structure of the electronic circuit in the portable data processing terminal of the first embodiment.

FIG. 2 is a block diagram showing the structure of an electronic circuit in the portable data processing terminal 11 of the data communication system.

The portable data processing terminal 11 comprises a CPU 21. The CPU 21 performs control of the operation of each section of the circuit in accordance with a system program and a variety of application programs previously stored in a ROM 22. In addition to the ROM 22, an RS232C I/F circuit 24 is connected to the CPU 21, the RS232C I/F circuit 24 being adapted to generate an interruption signal in response to a connection signal indicating the establishment of the connection with the I/F box 13 and output from the I/F switch 23 when the I/F switch 23 has been operated. Moreover, a key input terminal 25, a RAM 26, a display section 27 and a power supply circuit 28 are connected to the CPU 21.

The RS232C I/F circuit 24 generates the interruption signal in response to the connection signal supplied from the I/F switch 23, supplies the same to the CPU 21, and sends and receives data to and from the personal computer 12 through the RS232C I/F box 13. The communication data to be sent and received through the RS232C I/F circuit 24 is written and read to and from the RAM 26.

The key input terminal 25 is provided with character and symbol input keys, mode keys which are operated when the operation mode, such as a telephone number mode, schedule mode, calendar mode or a memo mode, is switched, various function keys which are operated when a kana/kanji conversion function, data registration function, a data retrieving function or the like is instructed.

The RAM 26 is provided with a work register in which data to be input or output to and from the CPU 21 is temporarily stored if necessary, an input register in which key input data is stored, a notebook data register in which various notebook data of, for example, telephone number, schedule, calendar and memo, is stored, and a communication data register in which communication data supplied through the RS232C I/F circuit 24 is stored.

On the display section 27, input data from the key input terminal 25 is sequentially displayed. Moreover, notebook data read from the RAM 26, and communication data or the like sent or received through the RS232C I/F circuit 24 are displayed in the corresponding modes.

The power supply circuit 28 has a power source comprising a dry cell battery or a rechargeable battery to supply operating electric power to each section of the circuit. The circuit which is supplied with electric power from the power supply circuit 28 is, in each section in the circuit, individually controlled in accordance with an instruction from the CPU 21.

The communication operation to be performed in the data communication system having the above structure will now be described.

Figure 3:
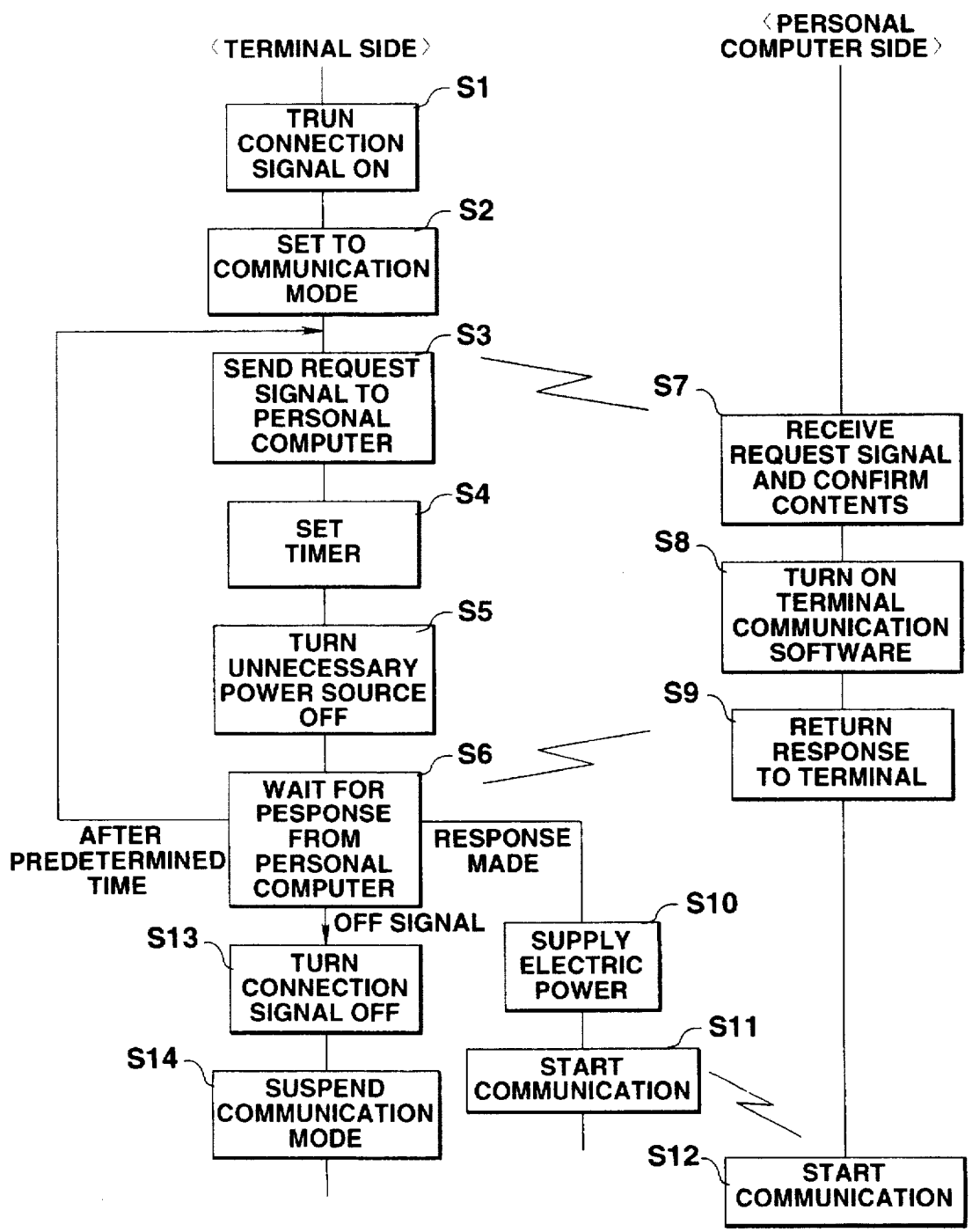
FIG. 3 is a flow chart showing the communication process to be performed between the portable data processing terminal and the personal computer.

FIG. 3 is a flow chart showing the communication process to be performed in the data communication system.

That is, when the portable data processing terminal 11 is placed on the RS232C I/F box 13, the I/F switch 23 of the portable data processing terminal 11 is switched on so that the connection signal is output as shown in step S1. The RS232C I/F circuit 24 generates the interruption signal in response to the connection signal and the interruption signal is supplied to the CPU 21.

The CPU 21 executes a communication program previously stored in the ROM 22 in response to the interruption signal so that the portable data processing terminal 11 is set to the communication mode (step S2).

When the CPU 21 has been set to the communication mode, the RS232C I/F circuit 24 sends communication request signal to the personal computer 12 through the RS232C I/F box 13 (step S3).

When the communication request has been issued as described above, a timer, for example, included in the CPU 21, and adapted to measure predetermined time (time until communication request is sent again) is set at step S4. Moreover, power supply signals from the power supply circuit 28 to circuits (for example, the display section 27) except a circuit required to receive a response signal from the personal computer 12 are interrupted (step S5). Therefore, a state for waiting for a response signal from the personal computer 12 is set (step S6).

In the personal computer 12, when the communication request signal sent from the portable data processing terminal 11 through the RS232C I/F box 13 has been received and the contents of the same have been confirmed at step S7. Then, at step S8, the software for communication between the personal computer 12 and the portable data processing terminal 11 is activated. Therefore, a response signal is returned to the portable data processing terminal 11 at step S9.

In the portable data processing terminal 11, it is determined at step S6 whether the response signal sent from the personal computer 12 has been received by the RS232C I/F circuit 24 through the RS232C I/F box 12. If the response signal is confirmed, the interruption signal is supplied from the RS232C I/F circuit 24 to the CPU 21 at step S10 so that the power supply signals from the power supply circuit 28 to the circuits (the display section 27 in the case), to which supply of electric power has been interrupted in step S5 are restarted.

At step S11, a response signal is returned to the personal computer 12 so that data communication through the RS232C communication cable is executed (step S12 at the personal computer side). If the communication request signal is a data backup request, the data stored in the RAM 26 of the portable data processing terminal 11 is sent to and stored in the personal computer 12 as backup data.

In a state in which the response from the personal computer 12 is waited for at step S6, if the response signal is not received and the measurement of the predetermined time by the inner timer set in step S4 is completed because, for example, the personal computer 12 is performing another process, the flow returns to step S3. The communication request is again sent from the RS232C I/F circuit 24 to the personal computer 12 through the RS232C I/F box 13.

That is, in the response waiting state in which no response signal from the personal computer 12 is received, the communication request is repeatedly sent from the RS232C I/F circuit 24 to the personal computer 12 through the RS232C I/F box 13 at each predetermined time measured by the inner timer.

When the portable data processing terminal 11 is removed from the RS232C I/F box 13, the I/F switch 23 of the portable data processing terminal 11 is switched off so that output of the connection signal is interrupted and the communication mode of the portable data processing terminal 11 is suspended (step S6 to steps S13, S14). Though the off detection of the connection signal is performed at step S6, it is not limit to this example. It is possible to perform the off detection at an interruption procedure of the CPU 21 as in the same manner as the on detection. In this case, an interruption signal is generated upon removal of the portable data processing terminal 11 from the RS232C I/F box 13.

According to the first embodiment, when the portable data processing terminal 11 is placed on the RS232C I/F box 13, the I/F switch 23 provided in the portable data processing terminal 11 is switched on to supply the connection signal to the RS232C I/F circuit 24. When the connection signal has been supplied to the RS232C I/F circuit 24, the interruption signal is supplied from the RS232C I/F circuit 24 to the CPU 21 so that the communication program previously stored in the ROM 22 is activated and the communication mode is set. Thus, the communication request is sent to the personal computer 12. The personal computer 12 returns the response in accordance with communication request sent from the portable data processing terminal 11 and executes the data communication process. Therefore, by only placing the portable data processing terminal 11 on the RS232C I/F box 13, the communication mode can be set so that data communication with the personal computer 12 is performed. Therefore, data communication can be performed very easily without complicated artificial operations.

Further, by only removing the portable data processing terminal 11 from the I/F box 13, the communication mode can be suspended.

In the response waiting state in which the response signal from the personal computer 12 is not received by the RS232C I/F circuit 24, communication request is repeatedly sent from the RS232C I/F circuit 24 to the personal computer 12 through the RS232C I/F box 13 at each predetermined time measured by the timer included in, for example, the CPU 21. Therefore, even if the personal computer 12 is, for example, performing another process, the operation of setting the communication mode (detaching and attaching operations with respect to the RS232C I/F box 13) is not required to be again performed. After the process which is being performed by the personal computer 12 is performed, data communication is automatically started.

In the state where response from the personal computer 12 is waited for, supply of the power supply signals from the power supply circuit 28 to the circuits (for example, the display section 27) except the circuit required to receive the response signal from the personal computer 12 is interrupted. Therefore, wasteful consumption of the capacity of the power source comprising a dry cell battery or a rechargeable battery can be prevented.

Although the embodiment has the structure which employs the RS232C I/F to form the I/F box 13, a wireless circuit using infrared rays or the like may be employed so that the I/F box 13 is connected to the personal computer 11 via a wireless channel.

According to the present invention, there is provided a data communication system in which when a connection of a portable data processing terminal with an I/F unit of a data processing apparatus has been detected, the portable data processing terminal is set to the communication mode, a data communication request is sent to the data processing apparatus, and data communication is executed. Therefore, by simply placing the portable data processing terminal on the I/F unit, data communication with the data processing apparatus can be performed.

Additional advantages and modifications will readily occur to those skilled in the art. Therefore, the present invention in its broader aspects is not limited to the specific details, representative devices, and illustrated examples shown and described herein. Accordingly, all such modifications are intended to be included within the scope of the present invention as defined in the following claims. In the claims, means-plus-function clause are intended to cover the structures described herein as performing the recited function and not only structural equivalents but also equivalent structures.

What is claimed is:

1. A data communication system for communicating data between a portable data processing terminal and a data processing apparatus, the system comprising:
    an interface unit connected to said data processing apparatus;
    means, provided in said portable data processing terminal, for detecting a connection between said portable data processing terminal and said interface unit;
    mode setting means, provided in said portable data processing terminal, for setting said portable data processing terminal to a communication mode;
    means, provided in said portable data processing terminal, for outputting a communication request to said data processing apparatus until said data processing apparatus responds to the communication request after said mode setting means sets the communication mode; and
    means, provided in said data processing apparatus, for executing data communication with said portable data processing terminal via said interface unit in response to the communication request.

2. The system according to claim 1, wherein said portable data processing terminal comprises means for resetting the communication mode of said portable data processing terminal when said connection detecting means stops detecting the connection.

3. The system according to claim 1, wherein said communication request outputting means outputs a next communication request to said data processing apparatus if data communication is not executed by said communication executing means after a predetermined time has passed from output of a previous data communication request.

4. The system according to claim 1, wherein
    said communication executing means returns a response signal to said portable data processing terminal in response to the communication request; and
    said portable data processing terminal comprises power source control means for switching off a power source unnecessary for receiving the response signal during a period of time from output of the data communication request to reception of the response signal.

5. The system according to claim 1, wherein
    said portable data processing terminal comprises:
        a CPU controlling said portable data processing terminal; and
        a switch which is turned on upon connection with said interface unit; and
        said mode setting means comprises means for setting the communication mode by interrupting said CPU upon turning on of said switch.

6. A portable data processing terminal comprising:
    means for detecting connection with a predetermined interface unit which is provided in a data processing apparatus;
    means for setting said portable data processing terminal to a communication mode in response to a connection detection of said detecting means;

means for outputting a communication request until said data processing apparatus responds to the communication request after said mode setting means sets the communication mode; and means for communicating data with the data processing apparatus via said interface unit.

7. The terminal according to claim 6, wherein said connector is an interface unit enabling the data communication with said data processing apparatus.

8. The terminal according to claim 6, wherein said communication request outputting means outputs a next communication request to said data processing apparatus if no response is returned from said data processing apparatus after a predetermined time has passed from output of a previous data communication request.

9. The terminal according to claim 6, further comprising power source control means for switching off a power source unnecessary for receiving the response during a period of time from output of the data communication request to reception of the response.

10. The portable data processing terminal according to claim 9, further comprising means for resetting the communication mode when said connection detecting means stops detecting the connection.

11. A data communication system for communicating data between a portable data processing terminal and a data processing apparatus, the system comprising:

an interface unit connected to said data processing apparatus;

means, provided in said portable data processing terminal, for setting said portable data processing terminal to a communication mode upon connection to said interface unit;

control means, provided in said data processing apparatus, for making said data processing apparatus perform a communication processing upon connection of said portable data processing terminal to said interface unit; and means, respectively provided in said portable data processing terminal and said data processing apparatus, for performing a data communication between said portable data processing terminal and said data processing apparatus after said portable data processing terminal and said data processing apparatus become a communication enable state.

12. The data communication system according to claim 11, wherein said portable data processing terminal comprises means for outputting a communication request to said data processing apparatus when the communication mode is set, and said control means comprises for starting a communication software program upon when the communication request is received.

* * * * *